US008325621B2

(12) United States Patent
Simonsson et al.

(10) Patent No.: US 8,325,621 B2
(45) Date of Patent: Dec. 4, 2012

(54) INTER-CELL INTERFERENCE CO-ORDINATION

(75) Inventors: Arne Simonsson, Gammelstad (SE); Anders Furuskär, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 445 days.

(21) Appl. No.: 12/595,751

(22) PCT Filed: Apr. 20, 2007

(86) PCT No.: PCT/SE2007/050257
§ 371 (c)(1),
(2), (4) Date: Nov. 30, 2009

(87) PCT Pub. No.: WO2007/120110
PCT Pub. Date: Oct. 25, 2007

(65) Prior Publication Data
US 2010/0128618 A1    May 27, 2010

(51) Int. Cl.
*H04J 1/16* (2006.01)
(52) U.S. Cl. .......... 370/252; 370/431; 455/522
(58) Field of Classification Search ............ 455/63.1, 455/63.3, 67.11, 450, 434, 442, 446, 423, 455/424, 500, 525, 513, 522; 370/229, 230, 370/252, 310, 318, 320, 330, 335, 468; 375/260
See application file for complete search history.

(56) References Cited

U.S. PATENT DOCUMENTS

| | | | | |
|---|---|---|---|---|
| 6,044,067 A | * | 3/2000 | Suzuki ............. | 370/252 |
| 6,128,473 A | * | 10/2000 | Ritzen et al. ........ | 455/63.3 |
| 6,137,991 A | * | 10/2000 | Isaksson ............. | 455/67.11 |
| 6,285,664 B1 | * | 9/2001 | Bernstein et al. ...... | 370/318 |
| 6,549,781 B1 | * | 4/2003 | O'Byrne et al. ....... | 455/446 |
| 6,771,934 B2 | * | 8/2004 | Demers et al. ........ | 455/63.1 |
| 2004/0018843 A1 | * | 1/2004 | Cerwall et al. ....... | 455/450 |
| 2005/0043062 A1 | | 2/2005 | Ahn et al. | |
| 2005/0136965 A1 | * | 6/2005 | Fourestie et al. ...... | 455/522 |
| 2006/0058054 A1 | * | 3/2006 | Hiramatsu ........... | 455/522 |
| 2006/0094363 A1 | * | 5/2006 | Kang et al. .......... | 455/63.1 |
| 2007/0042784 A1 | * | 2/2007 | Anderson ........... | 455/450 |
| 2007/0183544 A1 | * | 8/2007 | Lee et al. ........... | 375/346 |
| 2007/0243874 A1 | * | 10/2007 | Park et al. .......... | 455/442 |
| 2007/0298718 A1 | * | 12/2007 | Je et al. ............ | 455/63.1 |
| 2008/0032731 A1 | * | 2/2008 | Shen et al. .......... | 455/522 |
| 2008/0212539 A1 | * | 9/2008 | Bottomley et al. ..... | 370/335 |
| 2008/0247375 A1 | * | 10/2008 | Muharemovic et al. .. | 370/344 |
| 2008/0273511 A1 | * | 11/2008 | Wang et al. ......... | 370/342 |
| 2009/0069023 A1 | * | 3/2009 | Ahn et al. .......... | 455/450 |

FOREIGN PATENT DOCUMENTS

WO    2006/091172 A1    8/2006
WO    2007/044316 A1    4/2007

* cited by examiner

*Primary Examiner* — Abdullah Riyami
(74) *Attorney, Agent, or Firm* — Coats & Bennett, P.L.L.C.

(57) ABSTRACT

According to the present invention, a method in a base station is provided for predicting interference contribution, when scheduling an uplink data packet transmission from a first user equipment. The first user equipment is connected to the base station. The first user equipment is in the neighbor of a neighboring cell served by a neighboring base station. The method comprises the steps of: Obtaining signal strength measurements regarding the first user equipment. The signal strength measurements are based on a signal between the first user equipment and the neighboring base station; Receiving a resource scheduling request regarding the first user equipment for the uplink data packet transmission; Scheduling uplink resources for the requested uplink data packet transmission; Determining transmission power to be used for the scheduled uplink resources, and: Estimating an interference prediction contribution based on the determined transmission power and the obtained signal strength.

20 Claims, 3 Drawing Sheets

INTER-CELL INTERFERENCE CO-ORDINATION

TECHNICAL FIELD

The present invention relates generally to a method and an arrangement in a base station in a radio access network. In particular it relates to prediction interference contribution.

BACKGROUND OF THE INVENTION

Limiting the effects of inter-cell interference is an important factor for the performance of cellular radio communication systems. In Evolved—Universal Terrestrial Radio Access (E-UTRA) it is addressed specifically as Inter-cell interference mitigation. One of the discussed mitigation approaches is to avoid the use of the same frequency at the same time in neighbouring cells by co-ordination. According to E-UTRA, this inter-cell-interference co-ordination/avoidance may be defined for uplink in as: "The common theme of inter-cell-interference co-ordination/avoidance is to apply restrictions or preferences to the uplink scheduling, coordinated between cells. These restrictions can be in the form of restrictions to what time/frequency resources are available to the scheduler or restrictions on the transmit power that can be applied to certain time/frequency resources."

This co-ordination can be applied on different time scales from classical static frequency reuse to fully synchronized schedulers between cells. The faster the co-ordination the better are interference variations from bursty packet data services and varying radio situations followed, and the larger is the potential improvement. Simulation results with a static frequency reuse shows no performance gain for a wideband packet data service, while a fully synchronized co-ordination without any delay indicates a large potential gain. Thus, the co-ordination method and protocols are important and specifically the resulting delay. The current assumption for E-UTRA is a co-ordination time scale of seconds but faster co-ordination is suggested.

In UTRA Enhanced UpLink (EUL) there is a downlink control channel Enhanced-Relative Grant CHannel (E-RGCH). It enables signalling from neighbouring cells within active set (cells having 3-5 dB pathloss difference) to a user equipment. When the uplink measured inter-cell interference is high, relative grants can be sent to the user equipment reducing the grant relatively the absolute grant from connected cell resulting in decreased transmission power.

Interference can also be measured resulting in indirect co-ordination if used in scheduling or on/off power control.

Uplink interference measures are also used for link adaptation and closed loop power control either direct or as measured C/I. Closed loop power control measures the received quality and adjusts the transmission power with a Transmit Power Command (TPC) to the transmitter.

Measured interference is delayed and is not able to capture bursty packet data transmissions. Measured interference is delayed and is not able to capture bursty packet data transmissions. When the interference is measured and action can be taken the interfering transmission is completed or close to be completed. This result in poor interference prediction degrading the performance of the algorithms based on interference measures.

SUMMARY OF THE INVENTION

It is therefore an object of the present invention to provide a mechanism for improving inter-cell interference co-ordination and network capacity for transferring packet data.

According to a first aspect of the present invention, the object is achieved by a method in a base station for predicting interference contribution, when scheduling an uplink data packet transmission from a first user equipment. The first user equipment is connected to the base station. The first user equipment is in the neighbourhood of a neighbouring cell served by a neighbouring base station. The method comprises the steps of: Obtaining signal strength measurements regarding the first user equipment, which signal strength measurements are based on a signal between the first user equipment and the neighbouring base station; Receiving a resource scheduling request regarding the first user equipment for the uplink data packet transmission; Scheduling uplink resources for the requested uplink data packet transmission; Determining transmission power to be used for the scheduled uplink resources, and: Estimating an interference prediction contribution based on the determined transmission power and the obtained signal strength.

According to a second aspect of the present invention, the object is achieved by an arrangement in a base station. The base station is adapted to be connected to a first user equipment. The first user equipment is in the neighbour of a neighbouring cell served by a neighbouring base station. The base station arrangement comprises a receiving unit adapted to obtain signal strength measurements regarding the first user equipment, which signal strength measurements are based on a signal between the first user equipment and the neighbouring base station. The receiving unit is further adapted to receive a resource scheduling request regarding the first user equipment for a uplink data packet transmission. The base station arrangement further comprises a scheduling unit adapted to schedule uplink resources for the requested uplink data packet transmission. The scheduling unit is further adapted to determine transmission power to be used for the scheduled uplink resources. The base station arrangement further comprises an interference prediction estimation unit adapted to estimate an interference prediction contribution based on the determined transmission power and the obtained signal strength.

Since the interference prediction contribution is estimated based on the determined transmission power and the obtained signal strength, an interference contribution can be used by a neighbour cell already when starting to use a scheduled uplink resource, which implies that the inter-cell interference co-ordination and network capacity for transferring packet data are improved.

An advantage of the present invention is that it yields predictable interference, which in turn enables more accurate radio link quality estimation. This enables more efficient adaptation of transmission parameters, e.g. channel, power, modulation, channel coding, which yields higher user quality (e.g. bitrates), higher system capacity, and better coverage.

A further advantage of the present invention is that the interference per channel is predicted. This enables inter-cell interference co-ordination by scheduling on least interfered frequencies improving system capacity and coverage.

A yet further advantage of the present invention is that the link quality per channel is better estimated since the interference predicted. Frequency selective scheduling is then improved improving user quality and capacity.

DETAILED DESCRIPTION OF PREFERRED EMBODIMENTS

The invention is defined as a method and an arrangement which may be put into practice in the embodiments described below.

Figure 1:
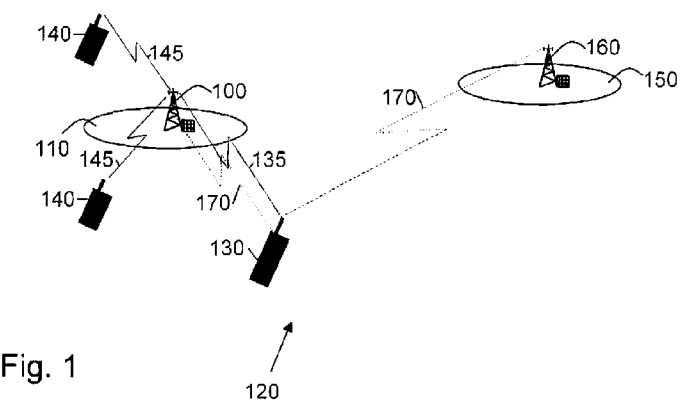
FIG. 1 is a schematic block diagram illustrating a scenario in a radio access network.

FIG. 1 depicts a base station 100 serving a cell 110 comprised in a radio access network 120 such as e.g. E-UTRA and Worldwide Interoperability for Microwave Access (WiMAX), UTRA, WLAN WCDMA GSM/GPRS. A first user equipment 130 is connected to the base station 100 which makes it possible for the first user equipment 130 to communicate with the base station 100, using resources 135 such as e.g. resource blocks, frequency bands, time slots), and/or spreading codes. Resource blocks are a frequency channels limited in time. The first user equipment 130 is connected to the cell 110, which cell 110 therefore is referred to as the connected cell 110. The base station 100 may further be connected to second user equipments 140, with which second user equipments 140, the base station 100 can communicate with using resources 145. The first user equipment 130 and second user equipments 140 may be any suitable radio communication device such as a laptop, a computer, a mobile phone, a Personal Digital Computer (PDA), or any other radio communication device that can communicate with base stations using radio communication.

The first user equipment 130 is further surrounded by a number of neighbouring cells comprised in the radio access network, whereof one neighbouring cell 150, served by a neighbouring base station 160 is depicted in FIG. 1. The base station 100 and the neighbouring base station 160 may be any suitable radio base station such as e.g. an eNode-B or Node-B in E-UTRA, a base station in WiMAX, which can communicate with user equipments using radio communication.

The base stations in the radio access network 120 including the base station 100 and the neighbouring base station 160 broad casts downlink signals 170 such as e.g. so-called pilots, which can be received by surrounding user equipments including the first user equipment 130. A signal is a signal transmitted for handover, cell selection, supervisory, control, equalization, continuity, synchronization, or reference purposes. The base stations in the radio access network 120 including the base station 100 and the neighbouring base station 160 also sends other signals which can be received by surrounding user equipments including the first user equipment 130. The signals 170 are referred to as dashed lines.

The power of the signals are exchanged between neighbouring cells 150, therefore the base station 100 is informed about the power of the signal $P_S$ sent from the respective neighbouring base stations 160. The signal power $P_S$ is usually used for handover proceedings, and may be distributed in a conventional way such as e.g. being distributed when the radio access network 120 is configured.

The first user equipment 130 performs signal measurements for handover in a conventional way, by listening to the transmitted signals 170 to find out if and when it is time to change the connection to the base station 100 to another base station and/or another cell. If any received signal 170 from a neighbouring cell 150 is stronger than the pilot transmitted by the connected base station 100, it indicates that that the radio communication conditions will be better if switching to that cell, i.e. perform a handover. These signal measurements are performed continuously typically with a period of around 100 ms when the first user equipment 130 is connected to any base station.

When the connected base station 100 schedules a resource such as e.g. a resource block for the first user equipment 130 in uplink according to the present solution, it uses the latest available signal measures for handover to identify potential interfered neighbouring cells 150. The connected base station 100 estimates an interference prediction contribution $I_{PC}$ (which will be described more in detail below) which may be sent to the "signal measured" neighbouring base stations 160. The estimated interference prediction contribution $I_{PC}$ may be sent as early as when scheduled (or preliminary scheduled) and typically at latest (finally scheduling) at the same time as a scheduling grant is sent to the first user equipment 130. A preliminary scheduling can be done when the scheduling request is received taking the current status in the cell into account, that is the known queue status of all user equipments in the cell and priority and quality of service information. If this is not changed until the scheduling grant is sent (at the time where the resource is scheduled) no update is needed. If new scheduling requests are received changing the preliminary scheduling, for example because of a higher priority request, the preliminary scheduling is changed and a new calculated interference prediction contribution $I_{PC}$ is sent. The neighbouring cells receiving interference prediction contribution $I_{PC}$ also from other base stations can summarize all those Interference prediction contributions to one total Interference Prediction and predict uplink interference per resource.

With reasonable base station to base station control signal delay the prediction is less outdated than a measured interference and better suited to follow interference variations caused by bursty packet data services. This prediction can improve the performance of quality based functions such as scheduling, link adaptation and closed loop power control.

Figure 2:
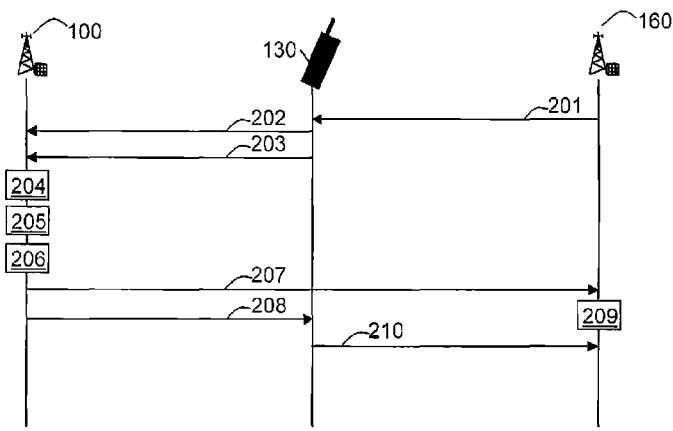
FIG. 2 is a combined signalling scheme and flow chart illustrating a method according to some embodiments of the present invention.

FIG. 2 is a combined flow chart and signalling diagram depicting some embodiments of the present solution. The method steps 201 to 205 are performed in a conventional way. The method comprises the steps of:

201. The first user equipment 130 measures received downlink signal strength SS of each of the respective signals that were sent from neighbouring base stations including the neighbouring base station 150. This is a usual measurement performed for handover.

202. The measured received signal strength of each of the respective signals SS are sent to the base station 100. This may be performed periodically or when passing defined thresholds.

When the first user equipment 130 wishes to transmit data packets via the base station 100 i.e. when there is uplink data to send, the first user equipment 100 sends a scheduling request to the base station 100. This is a usual request performed for scheduling. This scheduling request can be a request for a periodic resource allocation for a continuous uplink transmission, such as a semi-dynamic, persistent or semi-persistent scheduling request for a VoIP (Voice over IP) service requesting a resource allocation each 20 ms or similar. The measured received signal strength of each of the respective reference signals SS sent in step 202 and the scheduling request in this step 203 may be combined and sent in the same message, attaching SS measures within a certain threshold to the scheduling request. The scheduling request does not necessarily need to be initiated by the user equipment. For example the periodic resource request for a continuous service may be set up from any node that initiates the service, such as a VoIP call connection controlling node.

204. In the connected cell 110, the base station 100 schedules uplink resources, such as e.g. uplink frequency channels and time.

205. The transmission power $P_{SUR}$ to be used for the scheduled uplink resources is determined. Transmission power $P_{SUR}$ may be determined based on number of scheduled resource blocks, amount of data to be transmitted, uplink measurements (interference and radio link quality) and cell-planning.

The base station 100 estimates an interference prediction contribution $I_{PC}$, for each of the neighbouring cells from which the first user equipment 100 reported signal strength SS, including, the neighbouring cell 150. That is, the base station 100 makes a prediction of the interference that the scheduled uplink transmission may contribute to each of the respective neighbouring cells, including the neighbouring cell 150. The estimation is based on the received measured downlink signal strength SS of each of the respective signals in step 202. The interference prediction contribution $I_{PC}$ is estimated based on transmission power and pilot measurements, $I_{PC}=f(P_{SUR}, SS)$ per cell, and may for example by calculated by $[I_{PC}=P_{SUR}-(P_S-SS)]$ measured in dB). Where $P_S$–SS is the "path loss" of a signal that was sent from a neighbouring base station to the user equipment 130. Path loss is the reduction in power density (attenuation) of the signal as it propagates through space. The interference prediction contribution $I_{PC}$ may also be estimated by $I_{PC}=P_S$ own+delta SS+delta $P_S$, where the deltas are the differences between the own cell and the neighbour in question.

207. The interference prediction contribution $I_{PC}$, calculated in step 206 is sent to the respective neighbouring cell including, the neighbouring cell 150. This may be performed each time a scheduling is done also containing scheduled resource blocks, frequency channels and time. Alternatively, interference prediction contributions $I_{PC}$ are only sent to neighbouring cells when the Interference prediction contribution $I_{PC}$ is above a certain threshold where the interference is considered to be significant. Alternatively, the interference prediction contribution $I_{PC}$ from all scheduled users in the connected cell 110 are compiled into e.g. a matrix $I_{PC}$ [frequency channel, time] and sent to the neighbouring base stations. E.g. each transmission frame where an update of the scheduling is done, or when a significantly high or changing level of interference is predicted.

208. The base station 100 sends a scheduling grant message to the first user equipment 130 at the time when the transmission shall start. This may be performed at the same time as step 205 if there are resources available or later if other user equipments such as e.g. the second user equipments 140 in FIG. 1 are scheduled before, depending on the load and scheduling priority. The scheduling grant message comprises scheduled uplink resources and power control determining $P_{SUR}$.

209. The neighbouring radio base station 160 receives the interference prediction contribution $I_{PC}$ from the radio base station 100, it may further receive other interference prediction contribution $I_{PC}$ concerning other user equipments requesting an uplink resource from the base station 100 or any other base stations in the neighbourhood of the neighbouring base station 160. This may be received in one message for all user equipments in each cell as described in step 207. All received Interference prediction contributions are combined, for example summarized in linear scale, per resource according to received scheduling information forming a total interference prediction per resource. The total interference prediction per resource is used by the neighbour base station 160 in scheduling, link adaptation and power control.

210. When the uplink transmission starts, the neighbouring base station 160 may start the interference measurement on the used uplink resource block. The interference measurement may be combined with the total interference prediction contribution $I_{PC}$ and possibly used to refine the prediction.

The base station 100 may request the neighbouring base stations including the neighbour base station 160 for suitable resources before the step of scheduling, between step 203 and step 208. This request may be sent together with the interference prediction contribution $I_{PC}$, in step 207 above. The decision to send a request for suitable resources can be base on whether the user is scheduled to a later time while when the scheduling grant is sent immediately only the Interference prediction contribution $I_{PC}$ is sent.

Predicted interference and measured interference can be combined, for example by weighting.

Interference prediction contribution $I_{PC}$ may only be sent if the uplink transmission is estimated to have a duration exceeding a certain minimum time so that the $I_{PC}$ will be received before the transmission ends. This time is typically dependent on the delay of the base station to base station interface.

Figure 3:
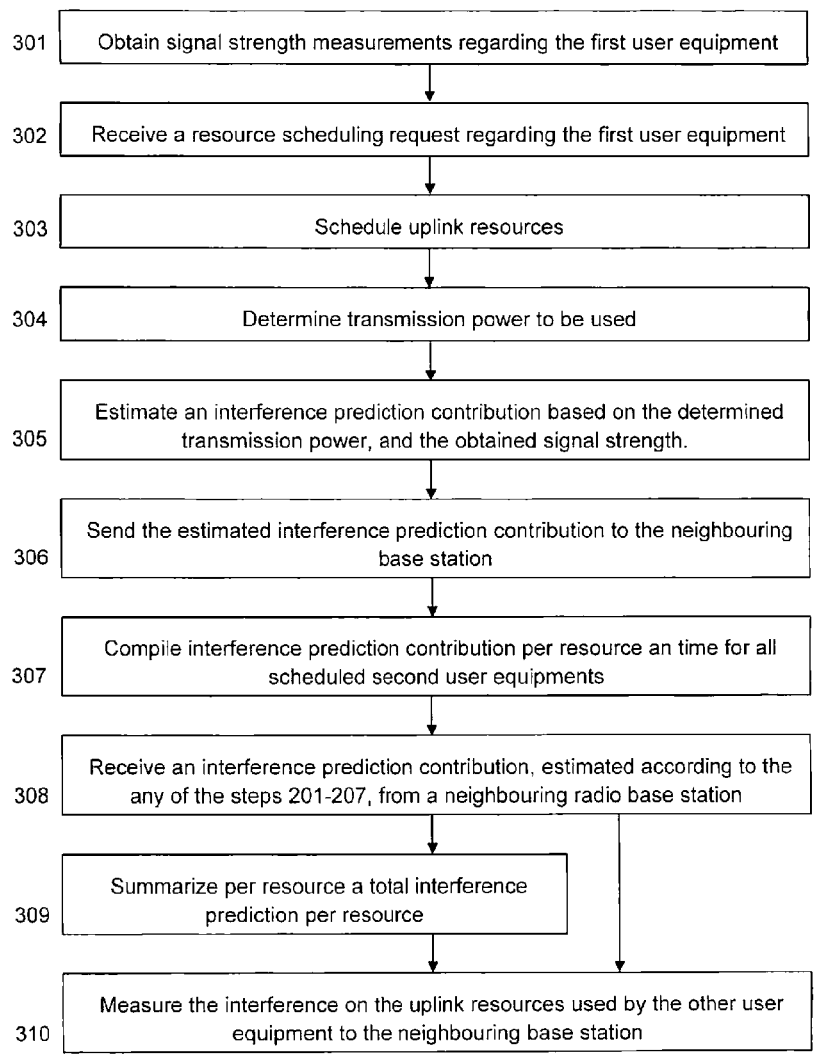
FIG. 3 is a flow chart illustrating a method in a base station according to some embodiments of the present invention.

The present method steps in the base station 100 for predicting interference contribution will now be described with reference to a flow chart depicted in FIG. 3. As mentioned above, the base station is connected to a first user equipment 130. The first user equipment 130 is in the neighbour of a neighbouring cell 150, served by a neighbouring base station 160. The method comprising the steps of:

301. The base station 100 obtains signal strength SS measurements regarding the first user equipment 130. The signal strength SS measurements are based on a signal between the first user equipment 130 and the neighbouring base station 130.

302. The base station 100 receives a resource scheduling request regarding the first user equipment 130 for the uplink data packet transmission.

303. The base station 100 schedules uplink resources for the requested uplink data packet transmission.

304. The base station 100 determines transmission power $P_{SUR}$ to be used for the scheduled uplink resources.

305. The base station 100 estimates an interference prediction contribution $I_{PC}$ based on the determined transmission power $P_{SUR}$, and the obtained signal strength SS. In some embodiments the base station 100 is aware of the power of the signal $P_S$ that the neighbouring cell 150 uses for broadcasting signals, the base station may then performed the estimation by calculating the interference prediction contribution $I_{PC}$ by means of the formula $[I_{PC}=P_{SUR}-(P_S-SS)]$. In some embodiments the step of obtaining signal strength SS measurements is more frequent than the step of receiving scheduling requests, in that case the base station 100 may use the latest available signal strength SS measurements for the step of estimating the interference prediction contribution $I_{PC}$.

306. The base station 100 may send the estimated interference prediction contribution $I_{PC}$ to the neighbouring base station 160 that the first user equipment 130 were receiving signal from. In some embodiments the estimated interference prediction contribution $I_{PC}$ will be used by neighbouring base station 160 in scheduling, link adaptation or closed loop power control.

In some embodiments this step of sending the estimated interference prediction contribution $I_{PC}$ is only performed when the Interference prediction contribution $I_{PC}$ is above a certain threshold or changes significantly.

In some embodiments this step of sending the estimated interference prediction contribution $I_{PC}$ is only performed if the uplink transmission is estimated to have a duration exceeding a predetermined time.

In some embodiments this step of sending the estimated interference prediction contribution $I_{PC}$ is performed before or at the same time as a scheduling grant is sent to the first user equipment 130.

307. In some embodiments at least one second user equipment 140 is connected to the base station and wherein all the steps are performed also for each of the at least one second user equipment 140. The base station 100 may then compile interference prediction contribution $I_{PC}$ per resource an time for all at least one scheduled second user equipments 140 in the connected cell 110 and sending the compiled interference prediction contribution $I_{PC}$ to the neighbouring base station 160. In some embodiments this step of sending the compiled interference prediction contribution $I_{PC}$ may be performed when an update of the scheduling is performed.

308. In some embodiments the base station 100 receives an interference prediction contribution $I_{PC}$, estimated according to any of the steps 201-207, from a neighbouring radio base station 160 concerning another user equipment that has been scheduled an uplink resource by the neighbouring radio base station 150.

In some embodiments the base station also receives an interference prediction contribution $I_{PC}$ estimated according to the steps of any of the claims 1-11, from each of a number of neighbouring radio base stations 150 concerning other user equipments requesting an uplink resource from the respective neighbouring radio base stations 150.

309. If step 308 is performed, the base station may summarize per resource a total interference prediction per resource.

310. If step 308 is performed, the base station 100 may measure the interference on the uplink resources used by the other user equipment to the neighbouring base station 160.

In some embodiments the base station 100 may combine the measured interference measurement with the interference prediction contribution $I_{PC}$ received from the neighbouring base station 160 to refine the interference prediction contribution $I_{PC}$ received from the neighbouring base station 160.

Figure 4:
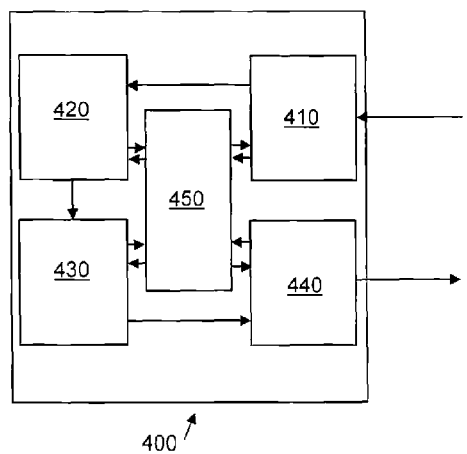
FIG. 4 is a schematic block diagram illustrating an arrangement in a base station.

To perform the method steps for predicting interference contribution, the base station 100 comprises an arrangement 400 depicted in FIG. 4.

The base station arrangement 400 comprises a receiving unit 410 adapted to obtain signal strength SS measurements regarding the first user equipment 130, which signal strength SS measurements are based on a signal between the first user equipment 130 and the neighbouring base station 130. The receiving unit 410 is further adapted to receive a resource scheduling request regarding the first user equipment 130 for an uplink data packet transmission.

The base station arrangement 400 further comprises a scheduling unit 420 adapted to schedule uplink resources for the requested uplink data packet transmission. The scheduling unit 420 is further adapted to determine transmission power $P_{SUR}$ to be used for the scheduled uplink resources.

The base station arrangement 400 further comprises an interference prediction estimation unit 430 adapted to estimate an interference prediction contribution $I_{PC}$ based on the determined transmission power $P_{SUR}$, and the obtained signal strength SS.

In some embodiments the base station 100 is aware of the power of the signal $P_S$ that the neighbouring cell 150 uses for broadcasting signals. In these embodiments interference prediction estimation unit 430 further may be adapted to performed calculation the interference prediction contribution $I_{PC}$ by means of the formula $[I_{PC}=P_{SUR}-(P_S-SS)]$.

The base station arrangement 400 further comprises a sending unit 440 adapted to send the estimated interference prediction contribution $I_{PC}$ to the neighbouring base station 160 that the first user equipment 130 were receiving signal from.

In some embodiments the receiving unit 410 is further adapted to receive an interference prediction contribution $I_{PC}$ estimated by a neighbouring radio base station 160 concerning another user equipment that has been scheduled an uplink resource by the neighbouring radio base station 150.

The present mechanism for predicting interference contribution may be implemented through one or more processors, such as the processor 450 in the base station arrangement 400 depicted in FIG. 5, together with computer program code for performing the functions of the present solution. The program code mentioned above may also be provided as a computer program product, for instance in the form of a data carrier carrying computer program code for performing the present solution when being loaded into the base station 100. One such carrier may be in the form of a CD ROM disc. It is however feasible with other data carriers such as a memory stick. The computer program code can furthermore be provided as pure program code on a server and downloaded to the base station 100 remotely.

When using the word "comprise" or "comprising" it shall be interpreted as non-limiting, i.e. meaning "consist at least of".

The present invention is not limited to the above-describe preferred embodiments. Various alternatives, modifications and equivalents may be used. Therefore, the above embodiments should not be taken as limiting the scope of the invention, which is defined by the appending claims.

The invention claimed is:

1. A method in a base station for predicting interference contribution, when scheduling an uplink data packet transmission from a first user equipment being connected to the base station, the first user equipment being in the neighborhood of a neighboring cell served by a neighboring base station, the method comprising the steps of:

obtaining signal strength (SS) measurements regarding the first user equipment, wherein each signal strength measurement of the signal strength measurements is based on a signal between the first user equipment and the neighboring base station;

receiving a resource scheduling request regarding the first user equipment for the uplink data packet transmission;

scheduling uplink resources for the requested uplink data packet transmission;

determining transmission power ($P_{SUR}$) to be used for the scheduled uplink resources;

estimating an interference prediction contribution ($I_{PC}$) for the neighboring cell based on the determined transmission power ($P_{SUR}$), and the obtained signal strength (SS) measurements, and a path loss between the neighboring base station and the first user equipment; and sending the estimated interference prediction contribution ($I_{PC}$) to the neighboring base station.

2. The method of claim 1, wherein the base station is aware of power ($P_S$) that the neighboring cell uses for broadcasting signals, and wherein the step of estimating is performed by calculating the interference prediction contribution by means of the formula [$I_{PC}=P_{SUR}-(P_S-SS)$], where $P_S-SS$ represents the path loss.

3. The method of claim 1, wherein the estimated interference prediction contribution is used by the neighboring base station in scheduling link adaptation or closed loop power control.

4. The method of claim 1, wherein the step of sending the estimated interference prediction contribution is performed only if the interference prediction contribution is above a certain threshold.

5. The method of claim 1, wherein the step of sending the estimated interference prediction contribution is performed only if the uplink transmission is estimated to have a duration exceeding a predetermined time.

6. The method of claim 1, wherein the step of sending the estimated interference prediction contribution is performed before or at the same time as a scheduling grant is sent to the first user equipment.

7. The method of claim 1, wherein at least one second user equipment is connected to the base station and wherein all the steps are performed also for each of the at least one second user equipment.

8. The method of claim 7, further comprising the steps of:
compiling interference prediction contributions per resource and time for all of the at least one scheduled second user equipment in a connected cell; and
sending the compiled interference prediction contribution to the neighboring base station.

9. The method of claim 8, wherein the step of sending the compiled interference prediction contribution is performed when an update of the scheduling is performed.

10. The method of claim 1, wherein the step of obtaining signal strength measurements is more frequent than the step of receiving resource scheduling requests, and further comprising using the latest available signal strength measurements for the step of estimating the interference prediction contribution.

11. The method of claim 1, wherein the base station receives an interference prediction contribution from a neighboring radio base station concerning at least one other user equipment that has been scheduled an uplink resource by the neighboring radio base station.

12. The method of claim 11, further comprising the step of measuring the interference on the uplink resources used by the other user equipment to the neighboring base station.

13. The method of claim 12, further comprising combining the measured interference with the interference prediction contribution received from the neighboring base station, to refine the interference prediction contribution received from the neighboring base station.

14. The method of claim 11, wherein the base station receives interference prediction contributions from each of a number of neighboring radio base stations concerning other user equipments requesting uplink resources from the respective neighboring radio base stations, and further comprising the step of compiling a total interference prediction per resource.

15. The method of claim 14, wherein the step of compiling a total interference prediction per resource is performed by summarizing all the received interference predictions per resource.

16. An arrangement in a base station, the base station configured to be connected to a first user equipment being in the neighborhood of a neighboring cell served by a neighboring base station, the base station arrangement comprising:
a receiving unit configured to obtain signal strength (SS) measurements regarding the first user equipment, wherein each signal strength measurement of the signal strength measurements is based on a signal between the first user equipment and the neighboring base station;
the receiving unit further being configured to receive a resource scheduling request regarding the first user equipment for an uplink data packet transmission;
the base station arrangement further comprising a scheduling unit configured to schedule uplink resources for the requested uplink data packet transmission;
the scheduling unit being further configured to determine transmission power ($P_{SUR}$) to be used for the scheduled uplink resources;
the base station arrangement further comprising an interference prediction estimation unit configured to estimate an interference prediction contribution ($I_{PC}$) for the neighboring cell based on the determined transmission power, and the obtained signal strength measurements, and a path loss between the neighboring base station and the first user equipment;
the base station arrangement further comprising a sending unit configured to send the estimated interference prediction contribution to the neighboring base station.

17. The base station arrangement of claim 16, wherein the base station is aware of power ($P_S$) that the neighboring cell uses for broadcasting signals, and wherein the interference prediction estimation unit is further configured to calculate the interference prediction contribution by means of the formula [$I_{PC}=P_{SUR}-(P_S-SS)$].

18. The base station arrangement of claim 16, wherein the receiving unit is further configured to receive an interference prediction contribution estimated by a neighboring radio base station concerning another user equipment that has been scheduled an uplink resource by the neighboring radio base station.

19. The base station arrangement of claim 18, wherein the base station arrangement is configured to use the estimated interference prediction contribution received from the neighboring cell in scheduling link adaptation or closed loop power control.

20. The base station arrangement of claim 19, wherein the base station arrangement is configured to measure the interference on the uplink resources used by the other user equipment of the neighboring base station, and to combine the measured interference with the interference prediction contribution received from the neighboring base station for the other user equipment, to refine the interference prediction contribution received from the neighboring base station.

* * * * *